July 4, 1944.  E. S. BARTLETT ET AL  2,352,596
POWER DRIVEN CLUTCH AND SHIFTER ASSEMBLY
Filed Jan. 30, 1942
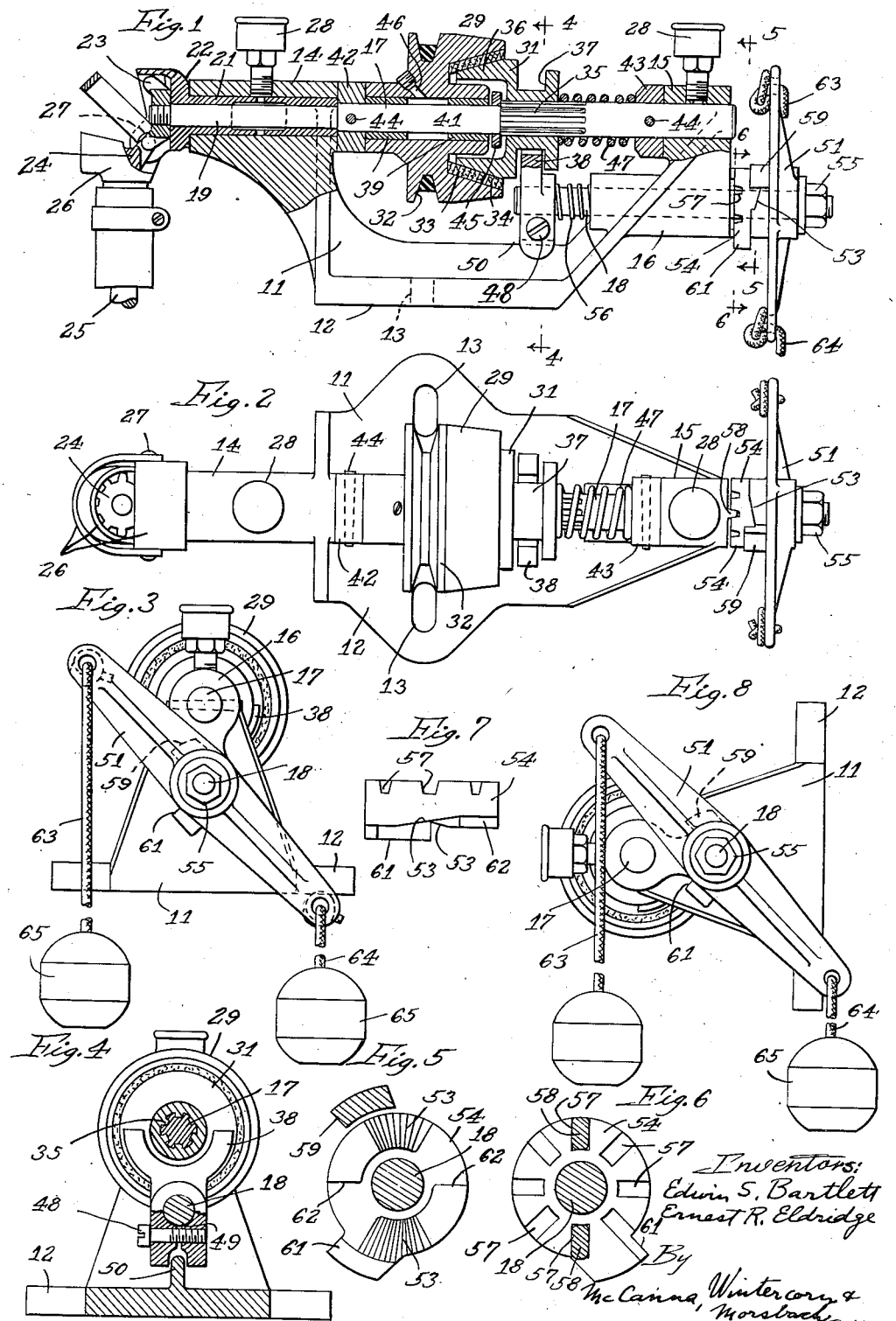

Patented July 4, 1944

2,352,596

UNITED STATES PATENT OFFICE

2,352,596

POWER DRIVEN CLUTCH AND SHIFTER ASSEMBLY

Edwin S. Bartlett and Ernest R. Eldridge, Chicago, Ill., assignors to Chicago Flexible Shaft Company, Chicago, Ill., a corporation of Illinois Application January 30, 1942, Serial No. 428,814

6 Claims. (Cl. 192—93)

This invention relates in general to power driven clutch and shifter assemblies and has more particular reference to devices of this kind adapted for different mountings.

The primary object of the invention is to provide an improved device for this general purpose.

Another object is to provide a device of this kind particularly designed and adapted for transmitting power to a shearing or clipping machine, for example, to a sheep shearing machine. In this case we have aimed to provide a drive mechanism of simple and rugged construction which may be applied as a unit of assembly to different mountings according to the circumstances or conditions under which the drive mechanism is intended for use, and wherein the clutch shifter may be quickly and easily accommodated to the assembly according to the particular mounting, so that the shifter may be operated in substantially the same way for each mounting.

Another object of the invention is to provide a mechanism of the character described which may be manufactured at a comparatively low cost and which will serve in an efficient and satisfactory manner the purposes intended.

Other objects and attendant advantages will be appreciated by those skilled in this art as the invention becomes better understood by reference to the following description when considered in connection with the accompanying drawing, in which—

Figure 1 is a side elevation of a power driven clutch and shifter assembly, partly in vertical section, embodying our invention;

Fig. 2 is a plan view thereof;

Fig. 3 is an end view thereof looking at the right hand end of Figure 1 and showing hand grips attached to the shifter cords;

Fig. 4 is a cross section taken substantially on the line 4—4 of Figure 1;

Figs. 5 and 6 are enlarged sections taken substantially on the section lines 5—5 and 6—6, respectively, of Figure 1;

Fig. 7 is a plan view of the cam collar on the same scale as shown in Fig. 5; and Fig. 8 is an end view of the mechanism in a different mounting and with the shifter lever set to accommodate this mounting.

Referring more particularly to the drawing which shows an illustrative form of our invention, we have provided a frame or bracket designated generally by 11, preferably in the form of a casting shaped to provide a flat base portion 12 adapted to seat against and be attached to a suitable support as by means of bolts (not shown) passing through openings 13, and bearing housings 14, 15 and 16, in the arrangement shown. A drive shaft designated generally by 17 is journalled in suitable bearings in the bearing housings 14 and 15 and a clutch shifter shaft 18 is supported in the bearing housing 16 for lengthwise movement therein when operated to shift the clutch which will be presently described. In this case the shaft 17 is journalled directly in the bearing housing 15 which may be relatively short in length because of the lighter bearing load at this end of the shaft, and the opposite or driving end has a reduced portion 19 journalled in a bearing sleeve 21 having a locating collar 22 at its outer end, this bearing being considerably longer than the opposite bearing and replaceable because of the heavier load in transmitting power from this end. Any suitable drive transmitting connection may be applied to this end of the drive shaft such, for example, as a universal joint including a gear 23 fixed to the drive shaft, a gear 24 fixed to a driven shaft 25 and a suitable yoke and trunnion housing structure 26 for maintaining the gears in driving connection while permitting movement of the driven shaft 25 to any angular position about the center 27, as well as the center of the drive shaft. In this case one of the trunnion yokes is integral with the sleeve bearing 21—22. Suitable means such as grease cups 28 are provided for lubricating the drive shaft bearings. While the drive transmitting here shown is especially designed for driving a shearing or clipping machine, it will be understood that it may be used for driving any device requiring a power drive with clutch control, within the capacity of the particular drive mechanism.

A clutch is mounted on the drive shaft between the bearing housings 14 and 15, preferably comprising a driving member 29 and a driven member 31, the member 29 having a V-groove 32 adapted to receive a V-belt driven from a suitable source of power and also having a cone socket 33 provided with a suitable cone face 34 of clutch lining material such as a cork composition, and the member 31 being splined on the drive shaft at 35 and having a cone portion 36 adapted to be frictionally engaged with the clutch lining 34 and having also an annular groove 37 adapted to receive a shifter yoke 38 which is operable to effect engagement and disengagement of the cone clutch. The driving member 29 has bushings 39 pressed into the center bore of said member and journalled on the portion 41 of the drive shaft, it being observed that the portion 41 is smaller in diameter than the splined portion of the shaft and larger than the driving end portion 19. The drive shaft is held against endwise displacement by end thrust collars 42 and 43 which are held in position on the shaft by taper pins 44. A spacing washer 45 is positioned on the drive shaft between the splined and the adjacent end of the driving member 29 for limiting movement of the latter member to the right. Lubricant may be provided for the driving member bearings through a suitable opening 46. A coil spring 47 of proper tension acting between the collar 43 and the cone shifter 31 is under constant compression tending to move the cone member into frictional driving connection with the cone face 33 of the driving member. This movement of the cone member 31 to engage the clutch as well as movement in the opposite direction to disengage the clutch is effected by the shifter yoke 38 by operation of the shifter shaft 18, it being observed in Fig. 4 that the shifter yoke is fixedly clamped to the shifter shaft 18 by means of a clamping screw 48 and that the member 38 is split at its lower end at 49 to allow for this clamping action, also that the frame is provided with a guide rib 50 which is disposed between the split lower ends of the shifter yoke to guide and prevent rotative displacement of the yoke member.

Manually operable means is provided for effecting the clutch shifting operation, comprising a shifter lever designated generally by 51 mounted for rotative movement on the projecting end of the shifter shaft 18 and having cam faces complemental to cam faces 53 on a cam collar 54 also loose on the projecting end of the shifter shaft 18 but normally held in fixed position against rotative movement thereon. Suitable means such as a nut 55 threaded on the outer end of the shifter shaft 18 holds the shifter lever 51 and the cam collar 54 in cooperative relation, in this instance against the tension of a coil spring 56 on said shaft acting between the bearing housing 16 and the shifter yoke 38 and tending to keep the cam faces engaged. The cam collar is adapted to be adjusted to any of a plurality of positions rotatively about the shifter shaft to change the location of its cam faces and consequently the operating position of the shifter lever 51 with relation to the drive mechanism as a whole. Any suitable means may be provided for this purpose but in the preferred embodiment we have provided a series of radial notches 57 in the inner face of the cam collar, in this instance eight equally spaced notches, and a pair of diametrically opposed lugs 58 fixed on the end wall of the bearing housing 16 and adapted to fit into any diametrical set of notches in the cam member. This adjustment may be effected either by loosening the clamping screw 48 and pulling outwardly on the shifter lever 51 sufficiently to permit of withdrawing the cam collar from the lugs and rotating the collar to the desired position in which it is to be re-set and then returning the parts to operative position, or the nut 55 may be loosened to permit of withdrawing the shifter lever 51 to permit of resetting the cam collar. There are two sets of cam faces 53 located in diametrically opposite relation. It will be observed that rotative movement of the shifter lever in the direction to release or disengage the clutch, that is, in a counterclockwise direction viewing Fig. 3, is limited by engagement of a stop lug 59 on the inner side of the lever against a stop lug 61 fixed to and projecting radially from the cam collar, and that rotative movement of the shifter lever in the opposite direction is limited by engagement of abutment faces on the shifter lever against complemental abutment faces 62 on the cam collar, these abutment faces being located at the low point ends of the cam faces. The shifter lever may be suitably shaped for movement by direct manual operation or by other means such, for example, as pull cords 63 and 64 attached to the outer ends of the lever and equipped with suitable hand grips 65.

In Figs. 1 to 5, inclusive, the parts are shown in operating position with the clutch engaged and the frame structure supported with its base portion 12 in a horizontal position and the clutch structure located above the base portion. In this case we prefer to set the cam collar so that the shifter lever is in the position shown in Fig. 3, occupying about a 45° angle with respect to the vertical. By pulling downwardly on the cord 63 the shifter lever will be cammed against the cam collar and thereby move the shifter yoke outwardly to withdraw the cone member and disengage the clutch. The clutch release position is about 90° from that shown in Fig. 3, limited by the stop lugs 59—61, and the parts will be retained in this position by reason of the tension of the springs 47 and 56 which is imposed by the high portions of the shifter cam member against the corresponding portions of the cam collar. Furthermore, each high portion of each cam member has a flat face as shown in Figs. 2, 3, 5 and 7, with the result that the flat faces of opposite members are seated one against the other when the clutch is in the release position and the spring tension above mentioned tends to hold the parts against displacement from this position. To engage the clutch the opposite cord 64 is pulled to the position shown in Fig. 3.

When it is desired to mount the drive mechanism in a different position such, for example, with the base portion 12 in a vertical plane for attachment to the side of an upright supporting member as shown in Fig. 8, the cam collar 54 will be re-set two notches in a clockwise direction with respect to the frame, that is, 90° to take care of the 90° change in position of the frame, to thereby locate the shifter lever in the operative position shown in Fig. 8. This is the same operative position as occupied in Fig. 3 wherein the base portion of the frame is horizontal instead of vertical.

It will be apparent from the foregoing that with the construction shown the frame may be mounted in at least eight different angular positions corresponding with the angular spacing of the notches 57 in the cam member and in which such position the shifter lever will occupy substantially the position shown in Fig. 3 with the clutch engaged. This is particularly advantageous and desirable in order to accommodate the drive mechanism and shifter to any of a large variety of circumstances and conditions of use. For example, the embodiment here shown is designed as a power drive or so-called "drive gear" for animal shearing and clipping machines and particularly for sheep shearing machines. This mechanism constitutes a unit of assembly adapted to be mounted in any of a variety of positions to serve the needs of a sheet shearing drive gear. Overhead mountings either in a horizontal or a vertical position are shown herein and it will be manifest that other angular positions with the clutch side of the frame position either at the right or left of the attachment base or above or below the same are available, appropriate adjustment of the shifter lever as determined by the definite settings of the cam collar being made for each particular mounting. It will also be manifest that this unit of assembly may be mounted either on a stationary structure or on a movable carrier as, for example, on a truck or on the rear end of a motor car so that it may be conveniently transported to the place of use. Also, any suitable source of power may be used as the prime mover as, for example, an electric motor, a gas engine, or a power line shaft. If desired, the driving member 29 may be provided with means other than the V-groove for the power transmitting connection.

It will also be observed that the parts are so designed and coordinated as to stand rugged usage and have long life, that the clutch elements are particularly well supported so that the cones will not wear out of round, and that in the event of general wear the replaceable parts are of comparatively low cost. Also, an endless V-belt for the drive is replaceable by withdrawing the drive shaft 17 to the right just enough so that its left hand end is removed from the collar 42, thereby permitting removal of the collar 42 and passage of a belt through the collar space. The pins 44 are, of course, removed for this purpose. The parts may then be restored to normal position. This permits replacement of the V-belt without disassembling or removing the clutch from the shaft. When the clutch is engaged the end thrust in opposite directions is between and against the end thrust collars 42—43 and not against either of the frame bearing housings. This promotes longer bearing life, particularly since the thrust collars are of a material having good wear resisting properties. In case of heavy wear the end thrust collars may be replaced at small cost.

It should be manifest that our invention is not limited for use with animal shearing and clipping machines but is capable of general application as a drive and clutch shifter mechanism.

Various modifications may be made in the device embodying our invention without departing from the spirit and scope of the appended claims, in which we claim:

1. A power driven clutch mechanism and shifter adapted for driving a sheep shearing machine and the like, comprising a frame adapted for attachment selectively in a vertical position or in a horizontal position to a support, a drive shaft journalled on the frame and having means adapted for transmitting drive to said shearing machine and the like, a driving clutch on the shaft, and a clutch shifter operable to cause the clutch to be engaged and disengaged comprising a shaft mounted on the frame with capacity for axial clutch shifting movement, a shifter cam adjustable on the frame to any of a plurality of positions angularly about the shifter shaft at least at 90° intervals circumferentially about said shifter shaft according to the mounting of the frame on its support, and a shifter lever rotatable on the shifter shaft and having a cam coacting with said shifter cam to effect engaging and disengaging of the clutch by camming against the shifter cam, the shifter lever being rotatable on said shaft through an arc of a given number of degrees to effect engaging and disengaging of the clutch, the shifter cam being adjustable to any of said different positions circumferentially about the shifter shaft to locate its cam in operative coaction with the cam on the shifter lever at any of said adjusted positions to thereby locate the shifter lever in position to operate through said given arc in any of said selective mountings of the frame.

2. A device as set forth in claim 1, in which the shifter cam is in the form of a collar on the shifter shaft having cam faces on one side coacting with complemental cam faces on the shifter lever to effect the clutch operation, and in which the cam collar is adjustable rotatively about the shifter shaft to any of a series of locations at 45° intervals circumferentially thereof, for the purpose described.

3. A device as set forth in claim 1, in which the shifter cam is in the form of a collar on the shifter shaft having cam faces on one side coacting with complemental cam faces on the shifter lever to effect the clutch operation, and in which the opposite side of the collar is provided with a plurality of notches spaced at 45° intervals circumferentially of the collars adapted for coaction with a holding lug on the frame for setting the collar in any of said notches 45° apart, for the purpose described.

4. A device as set forth in claim 1, in which the frame is provided with a guide rib parallel with the shifter shaft and the clutch shifter yoke is constructed to coact with said guide rib to prevent rotative movement of the yoke.

5. A device as set forth in claim 1, in which the shifter lever is loosely mounted for rotative movement on the projecting end of the clutch shifter shaft which in turn is mounted for lengthwise sliding movement on the frame to effect engagement and disengagement of the clutch, and the lever has diametrically opposite arms each of which is provided at its outer end with a pull cord.

6. A power driven clutch mechanism and shifter comprising a frame having a base portion adapted to be attached to a support and provided with spaced coaxial bearings, a shaft journalled in said bearings adapted for transmitting drive, a combined drive member and cone clutch socket journalled on the shaft between said bearings, a clutch cone splined on said shaft between said drive member and one of the bearings, a coil spring on the shaft acting to press the clutch cone into clutch engagement with the cone socket of the drive member, a clutch shifter shaft mounted in a bearing on the frame parallel with the drive shaft, a yoke fixed to said shifter shaft engaging the clutch cone for shifting the latter to engage and disengage the clutch by lengthwise movement of the shifter shaft in its bearing, a cam collar on the shifter shaft at the outer end of the frame, a coacting lug and socket connection between the cam collar and the frame permitting rotative adjustment of the cam about the shifter shaft and holding the cam collar in any position in which it may be so located, a cam on the outer end of the cam collar, a shifter lever freely rotatable on the outer end of the shifter shaft and having a cam face adapted to coact with the cam face on said collar, an end thrust member at the outer end of the shifter shaft against which the outer end of the shifter lever coacts, and a coil spring on the shifter shaft acting to normally urge the shifter lever cam against the cam collar, the shifter lever being operable by rotative movement to effect clutching and de-clutching of the cone clutch by said camming action, and the cam collar being rotatively adjustable with respect to the frame to change the location of the cam collar and consequently the operating location of the coacting shifter lever according to the mounting of the frame.

EDWIN S. BARTLETT.
ERNEST R. ELDRIDGE.